US 6,743,276 B1

(12) United States Patent
Lane

(10) Patent No.: US 6,743,276 B1
(45) Date of Patent: *Jun. 1, 2004

(54) METHOD AND APPARATUS FOR SOLAR HEATING A MINING LEACH SOLUTION

(76) Inventor: Richard P. Lane, 4226 Whisper La., De Pere, WI (US) 54115

( * ) Notice: Subject to any disclaimer, the term of this patent is extended or adjusted under 35 U.S.C. 154(b) by 0 days.

This patent is subject to a terminal disclaimer.

(21) Appl. No.: 10/222,328

(22) Filed: Aug. 16, 2002

Related U.S. Application Data

(60) Provisional application No. 60/313,450, filed on Aug. 17, 2001.

(51) Int. Cl.[7] .................................................. C22B 3/04
(52) U.S. Cl. ........................... 75/712; 75/743; 266/101; 266/170
(58) Field of Search ................... 75/712, 743; 266/101, 266/170

(56) References Cited

U.S. PATENT DOCUMENTS

| 4,091,070 A | 5/1978 | Riggs et al. ................... 423/41 |
| 4,318,892 A | 3/1982 | Von Kohorn ............... 422/279 |
| 4,348,056 A | 9/1982 | Von Kohorn ................... 299/4 |
| 4,526,615 A | 7/1985 | Johnson ........................ 75/101 |
| 4,701,309 A | 10/1987 | Ramachandran et al. ...... 423/20 |
| 4,739,973 A | 4/1988 | Herndon ...................... 266/101 |
| 4,960,584 A | 10/1990 | Brown ..................... 423/658.5 |
| 5,005,806 A | 4/1991 | Krauth ........................ 266/101 |
| 5,030,279 A | 7/1991 | Krauth ........................ 75/712 |
| 5,316,567 A | 5/1994 | Jones ........................... 75/743 |
| 5,402,991 A | 4/1995 | Schindler .................... 266/101 |
| 5,421,858 A | 6/1995 | Smith .......................... 75/746 |
| 5,683,490 A | 11/1997 | Earley, III et al. ............. 75/712 |
| 6,053,964 A * | 4/2000 | Harrell ........................ 75/712 |
| 6,149,711 A | 11/2000 | Lane ........................... 75/712 |

* cited by examiner

Primary Examiner—Melvyn Andrews
(74) Attorney, Agent, or Firm—Andrus, Sceales, Starke & Sawall, LLP

(57) ABSTRACT

A method and apparatus for solar heating a leach solution prior to its distribution over an ore heap. The apparatus includes a heat absorbing mat having a series of individual heat absorbing tubes joined to each other by heat reflecting panels. The heat reflecting panels and heat absorbing tubes collect and transfer solar energy to the leach solution passing through the heat absorbing tubes. The temperature of the leach solution passing through the heat absorbing tubes is elevated above ambient prior to the leach solution being distributed to a series of emitter tubes positioned on top of the ore heap. The array of emitter tubes are connected to the heat absorbing mats such that the leach solution is heated within the mat and immediately distributed to the emitter tubes for distribution onto the ore heap.

10 Claims, 5 Drawing Sheets

METHOD AND APPARATUS FOR SOLAR HEATING A MINING LEACH SOLUTION

CROSS-REFERENCE TO RELATED APPLICATION

The present invention is based on and claims priority to U.S. Provisional Application Serial No. 60/313,450, filed on Aug. 17, 2001.

BACKGROUND OF THE INVENTION

The present invention relates to heap leach mining. More specifically, the present invention relates to a method and apparatus used in heap leach mining that involves solar heating and distribution of a leach solution prior to its percolation through an ore heap.

Copper is frequently recovered from extremely low grade ores and from mine wastes by a process known as heap leaching. The term "heap" as used in the art means a bed of low grade ore that has been suitably spread over a prepared surface or "pad". A dilute sulfuric acid solution is percolated through the heap and the "pregnant" copper-bearing acid solution is collected after it has percolated through the heap. Typically, the pad on which the heap rests is formed from an impervious material, such as sheets of plastic film (polyethylene), asphalt and/or compacted clay. The heap is often times constructed on an incline such that the copper-bearing leach solution that has percolated through the heap is collected in a reservoir.

The heap of ore is normally piled onto each impervious pad to a depth of 10 to 30 feet after the ore has been pre-crushed to a sufficiently small size to enable the leach solution to reach the metallic-mineral particles contained in the ore. It is a characteristic of heap leach mining that the maximum amount of copper can be recovered from the ore over a long period of time, typically measured in months and years. For example, a typical heap leach operation may reach a maximum copper recovery in a period of two to three years.

After the leach solution has passed through the ore heap, the copper-bearing leach solution is subjected to a solvent extraction process in which the copper is transformed from dilute leach solution into a pure and concentrated solution termed advance electrolyte. After the extraction, the advance electrolyte is subjected to an electro-winning process in which the dissolved copper plates out onto permanent stainless steel plates or pure thin copper sheets used as cathodes. The plated copper on each of the stainless steel cathodes can be removed and processed. The copper sheets, when used, grow in weight and can be processed as required.

Conventional percolation systems for heap leach mining normally includes a series of individually spaced emitter tubes extending over the heap of ore. Each of the spaced tubes receives the leach solution and includes a series of openings to permit the leach solution to be distributed for uniform percolation down through the heap. An example of such a system is shown in the Krauth U.S. Pat. No. 5,030,279. In this type of system, each of the individual tubes are laid out over the ore heap in the desired spaced relationship such that the leach solution adequately permeates through the ore heap.

In heap leach operations, it has been found that metal recoveries are considerably lower in the winter season due to lower temperatures of the ore and the leach solution. Heap leach operations, utilizing both chemical and biological leach solutions, tend to operate most efficiently at temperatures above ambient. While others have proposed heating the leach solution at a location remote from the heap, heating the leach solution at such a remote location has proven to be very inefficient due to the substantial amount of heat lost to atmosphere as the leach solution is distributed to the tubing placed on the heap.

An example of a type of heaping and distributing system proposed to solve such problems is shown in the Lane U.S. Pat. No. 6,149,711. In the Lane '711 patent, a distribution mat having a series of individual emitter tubes connected to each other by heat absorbing panels is disclosed. The distribution mat is laid out over the heap and the temperature of the leach solution passing through the emitter tubes is elevated above ambient prior to the leach solution circulating down through the ore heap through openings formed in the emitter tubes of the mat. Although this type of system has proven to be an effective way to increase the temperature of the leach solution prior to the distribution over the ore heap, the pores formed in the emitter tubes create a problem in forming the mat and substantially increase the cost of the mat.

Therefore, it is an object of the present invention to provide a method of increasing the rate at which a semi-precious metal can be extracted from an ore heap. It is a further object of the invention to provide a method that solar heats a leach solution prior to the leach solution being distributed over the bed of ore. It is an additional object of the invention to provide a method that solar heats the leach solution immediately prior to the leach solution being percolated through the ore heap. Further, it is an object of the invention to provide an apparatus that increases the temperature of the leach solution immediately prior to the leach solution being applied to the ore heap. It is a further object of the invention to provide an apparatus that solar heats the leach solution prior to its percolation through the ore heap.

SUMMARY OF THE INVENTION

The present invention is a method and apparatus for heating a leach solution that is applied over the surface of the dump. The apparatus is a heating tube and mat assembly having a plurality of tubes joined to a underlying mat.

Each of the heat absorbing tubes is joined to the heat absorbing/heat retaining mat providing for a generally flat cover for the surface of the leach dump. The mat and tubes positioned over the surface of the dump collect solar energy. The solar energy absorbed by each of the heat absorbing tubes is transferred by conduction to the leach solutions passing through the heat absorbing tubes. The transferred heat elevates the temperature of the leach solution above ambient prior to the leach solutions being supplied to a separate array of drip lines or emitter tubes positioned on the surface of the ore heap.

In the preferred embodiment of the invention, the heat absorbing tubes are joined by a flexible material such that the heat absorbing tubes absorb solar energy that is then transferred to the leach solution. Preferably, the material used to form the heat absorbing mat is sufficiently flexible to allow the distribution mat to be rolled onto a spool when not in use. The spacing between the individual heat absorbing tubes is determined by the specific application for the distribution mats.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
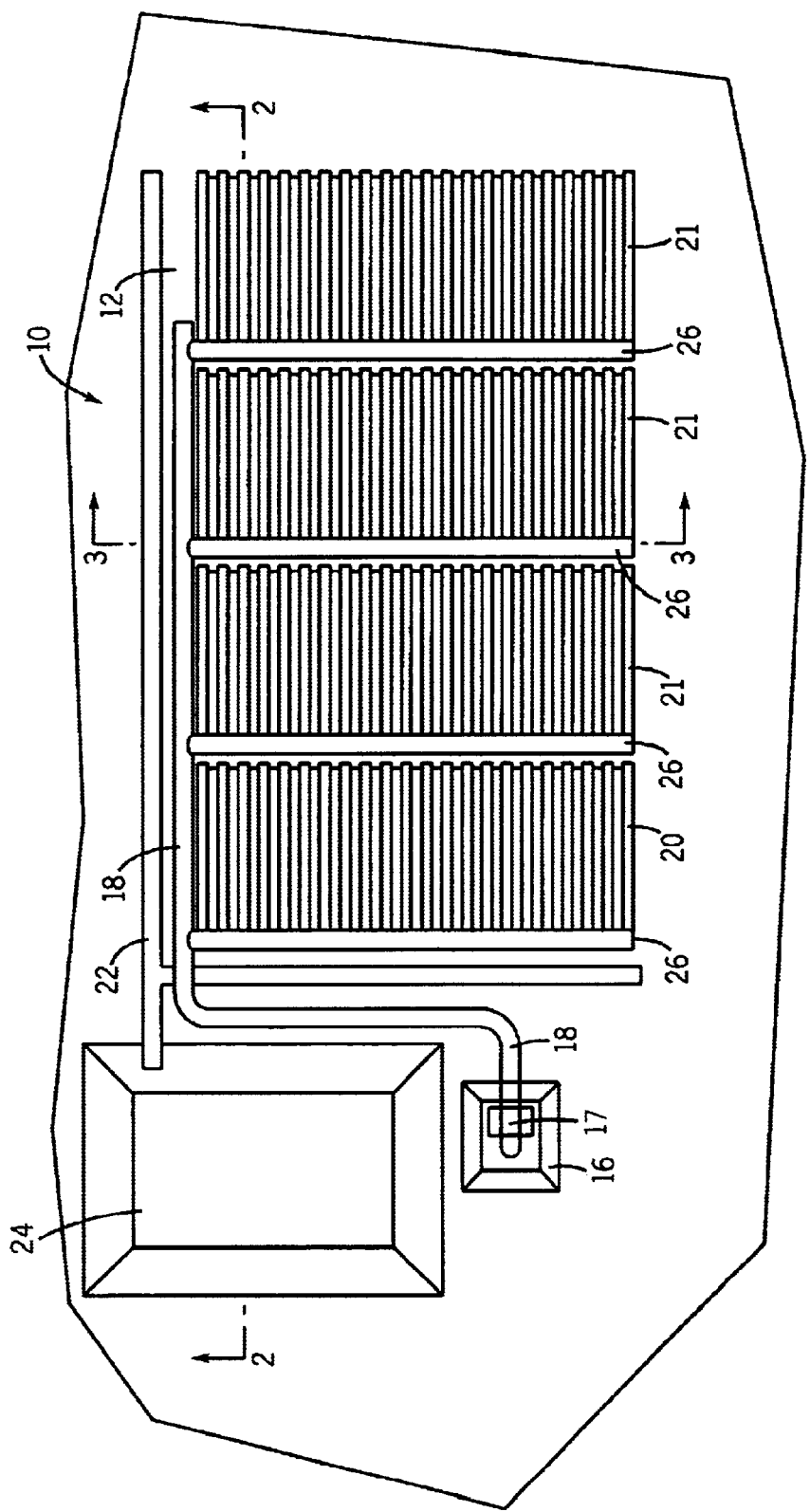
FIG. 1 is a top plan view of a heap leach mine utilizing a solar heating and distributing device of the present invention to apply a mining leach solution over a heap of ore.
Figure 2:
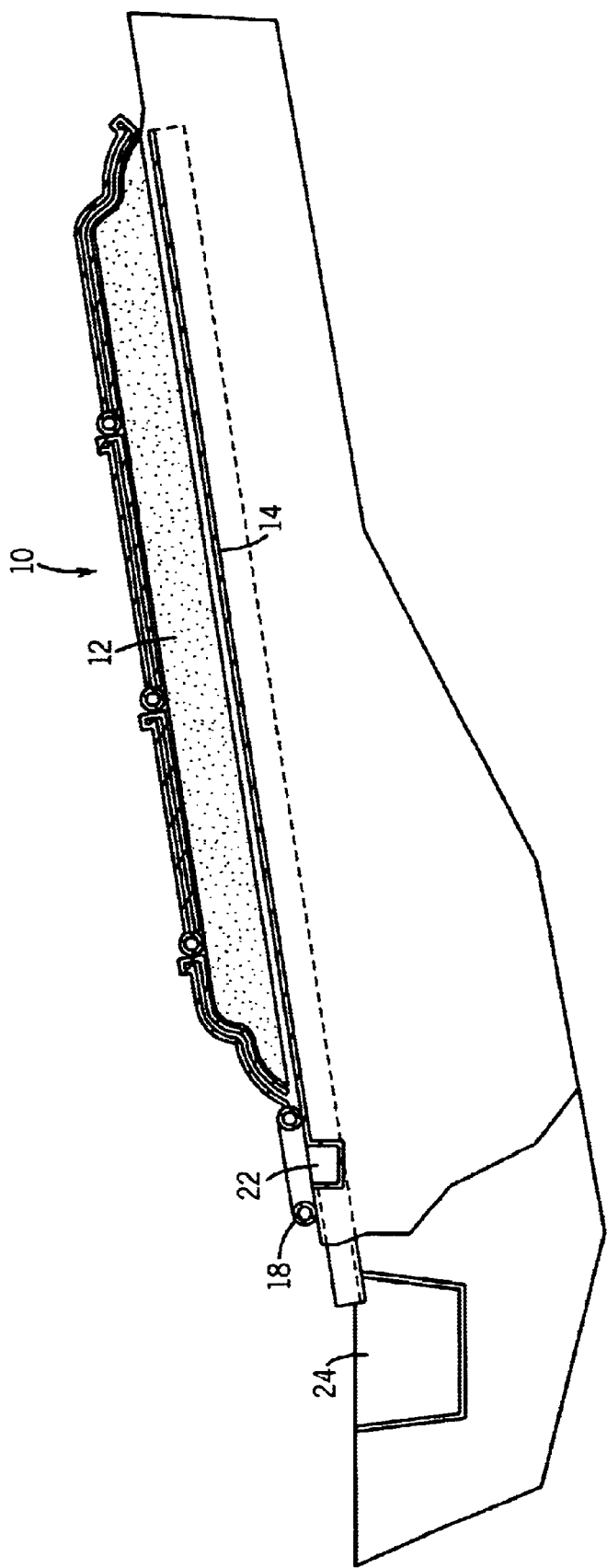
FIG. 2 is a section view taken along line 2—2 of FIG. 1 illustrating multiple solar heating and distributing devices positioned over the emitter tubes on the heap of ore.

FIGS. 1 and 2 illustrate a heap leach mining system 10 of the present invention as positioned on a bed or "heap" 12 of low grade ore. The heap of ore 12 is comprised of pre-crushed ore of a sufficiently small size that has a typical depth of between 10 and 30 feet. The ore contained in the heap 12 typically contains small concentrations of a metal to be collected, such as low grade gold, silver or copper. In the embodiment of the invention to be described, the ore includes trace amounts of copper, although the invention is equally applicable to ores containing other metals. As shown in FIG. 2, the ore heap 12 is deposited on a pad 14 formed from an impervious material, such as sheets of plastic film, asphalt, and/or compacted clay. The pad 14 prevents a leach solution from entering into the ground and being absorbed, thereby reducing contamination of the ground.

As shown in FIG. 1, a supply of leach solution used to remove the desired material from the heap of ore 12 is drawn from a reservoir 16 by a pump 17 and a supply pipe 18. The supply pipe 18 runs along the bottom edge of the heap 12 and is connected to a plurality of heat absorbing mats 21 constructed in accordance with the present invention. Since the ore heap 12 typically extends for hundreds of feet, numerous heat absorbing mats 21 are utilized to adequately cover the top surface area of the heap 12. The heat absorbing mats 21 heat the leach solution prior to the solution percolating down through the ore heap 12 to be collected on the impervious pad 14.

As can be seen in FIG. 2, the ore heap 12 is constructed on an incline, such that the leach solution percolated down through the ore heap 12 is directed by gravity to the lower edge of the pad 12, where the metal-bearing leach solution is collected in a collection trough 22. The collection trough 22, in turn, feeds the pregnant leach solution to a collection reservoir 24. The supply of pregnant leach solution from the collection reservoir 24 is then subject to a solvent extraction and electro-winning process in which the metallic material suspended in the pregnant leach solution is extracted from the pregnant leach solution in a conventional manner.

Referring back to FIG. 1, each of the heat absorbing mats 21 generally includes a main conduit 26 extending along a longitudinal axis and a plurality of heat absorbing tubes 20 extending outward from the main conduit 26. In the preferred embodiment of the invention, the longitudinal axis of each heat absorbing tube 20 is perpendicular to the longitudinal axis of the main conduit 26. The main conduit 26 of each heat absorbing mat 21 is in fluid communication with the supply pipe 18 such that leach solution being pumped through the supply pipe 18 flows into the main conduit 26 of each heat absorbing mat 21. In a contemplated embodiment of the invention, the length of the main conduit 26 is approximately 50 feet while the length of each heat absorbing tube 20, and thus the heat absorbing mat 21, is approximately 200 feet, although other lengths are contemplated depending on the specific heap 12 being mined.

Figure 3:
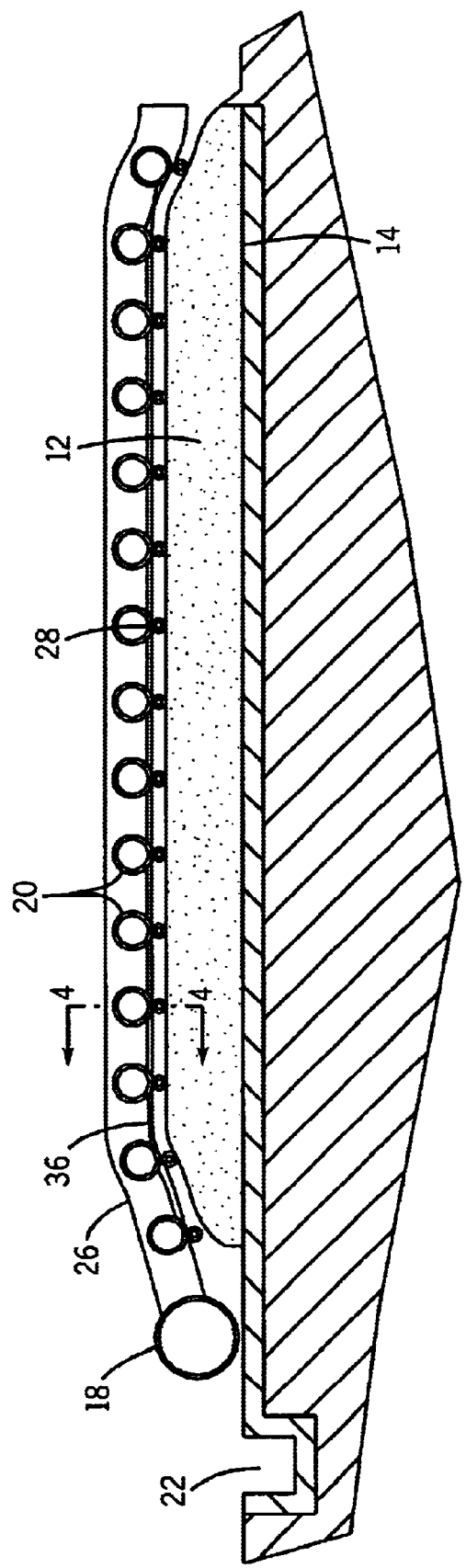
FIG. 3 is a section view taken along line 3—3 of FIG. 1 illustrating a main conduit and a heat absorbing mat of the solar heating and distributing device.
Figure 4:
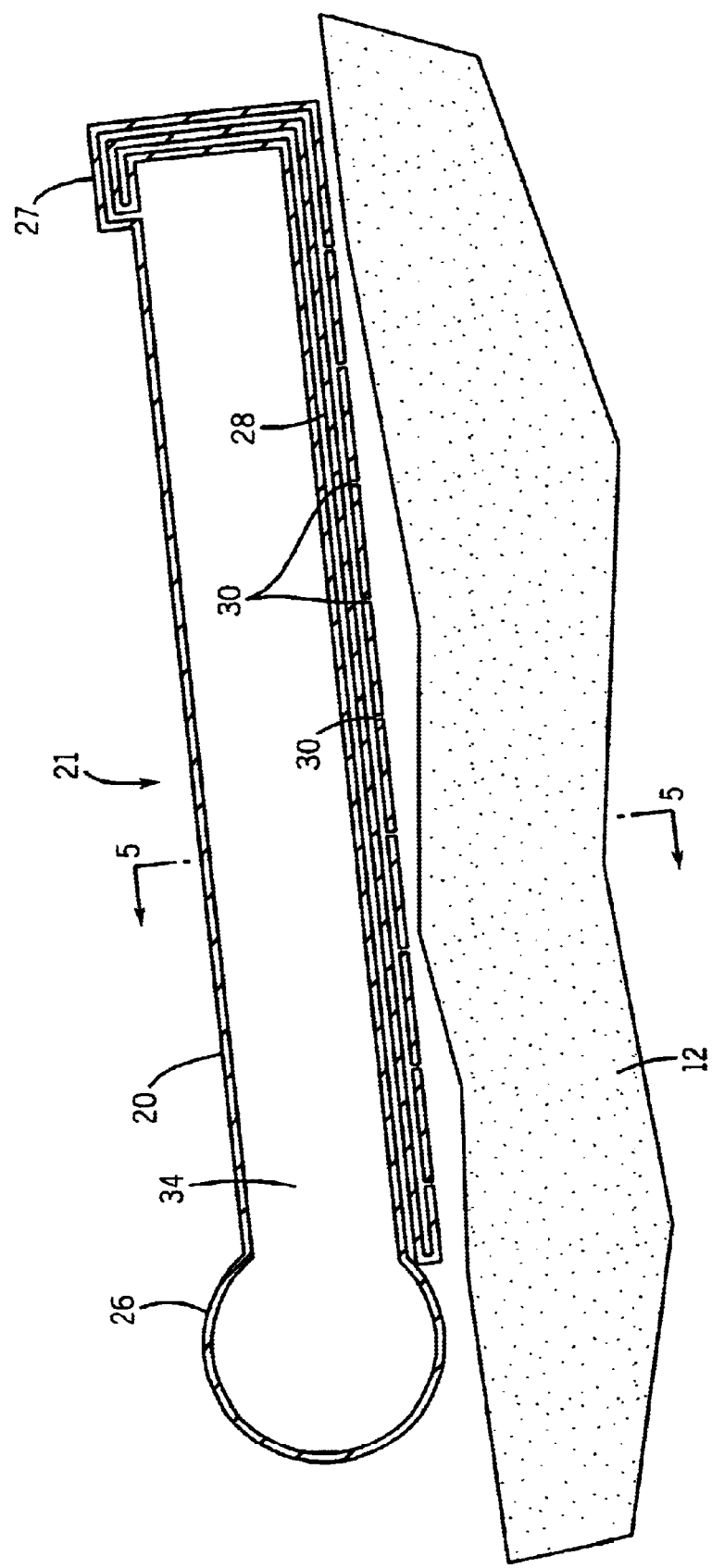
FIG. 4 is an enlarged, partial section view taken along line 4—4 of FIG. 3 illustrating the main conduit and one of the heat absorbing tubes contained in the heat absorbing mat of the present invention, as well as the connection between the heat absorbing tubes and the emitter tubes.

Referring now to FIGS. 3 and 4, the mat supply main conduit 26 of each heat absorbing mat 21 is in fluid communication with each of the plurality of heat absorbing tubes 20, such that the leach solution flowing through the mat supply main conduit 26 flows through each of the plurality of heat absorbing tubes 20. In the preferred embodiment of the invention, each of the heat absorbing tubes 20 is integrally formed with the mat supply main conduit 26 such that no fittings or external connections are required between the mat supply main conduit 26 and the heat absorbing tubes 20. In the preferred embodiment of the invention, both the heat absorbing tubes 20 and the mat supply main conduit 26 are formed from a relatively flexible polyethylene material, such as is commercially available from Dupont.

Referring now to FIGS. 3 and 4, the heat absorbing mat 20 is positioned above a plurality of emitter tubes 28 positioned directly on top of the ore heap 12. The plurality of emitter tubes 28 are used to distribute the leach solution through the ore contained within the heap after the solution has been heated by one of the absorbing mats 21.

Referring now to FIG. 4, each of the emitter tubes 28 includes a plurality of emitter openings 30 that allow the leach solution to exit the emitter tube 28 and pass through the ore. The emitter tubes 28 are conventional in construction and have been used for many years in the leaching of iron ore.

As can be seen in FIG. 4, each of the emitter tubes is in fluid communication with one of the heat absorbing tubes 20 through a supply connection 27. Thus, after the leach solution has been heated while contained within the heat absorbing tube 20, the heated leach solution exits through the supply connection 27 and flows out of the emitter openings 32 in the emitter tubes 28. As can be understood in FIGS. 3–5, the heat absorbing mat 21, including the heated absorbing tubes 20, heats the supply of leach solution prior to the solution being received within the emitter tubes 28 positioned beneath the mat. In this manner, the heat absorbing mat 21 is able to heat the leach solution immediately prior to its application onto the ore heap.

Figure 5:
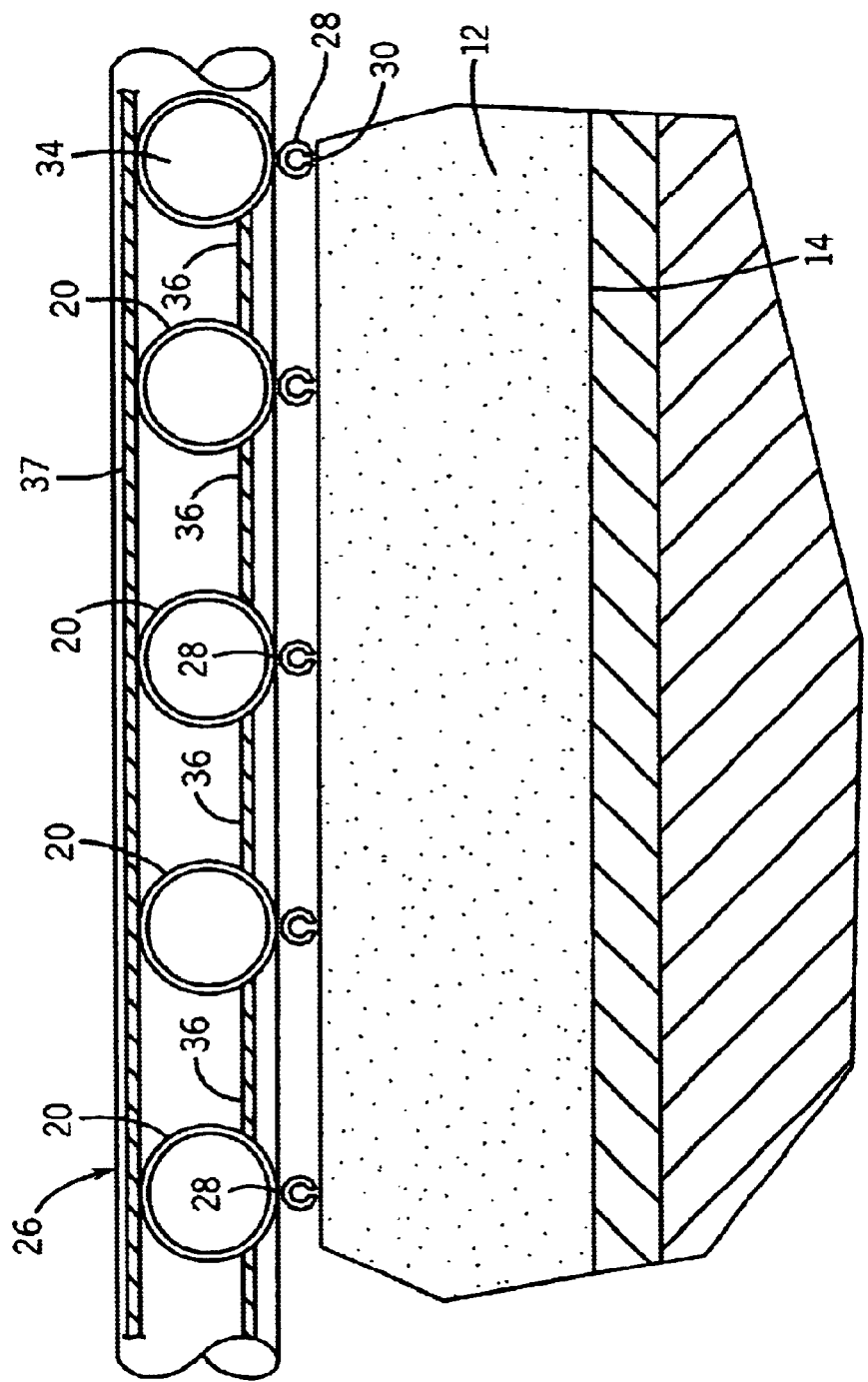
FIG. 5 is a partial section view taken along line 5—5 of FIG. 4 further illustrating the spacing and connection between a plurality of heat absorbing tubes and the position of the emitter tube on the ore heap.

Referring now to FIG. 5, in the preferred embodiment of the invention, each of the heat absorbing tubes 20 is joined to the adjacent heat absorbing tube 20 by a reflecting panel 36. The series of reflecting panels 36 reflect received sunlight toward one of the heat absorbing tubes 20 such that the heat absorbing tubes 20 are more efficient at transferring solar energy to the leach solution. In the preferred embodiment of the invention, each of the reflecting panels 36 is formed from a reflective material that directs sunlight onto the heat absorbing tube 20.

As can also be seen in FIG. 5, it is contemplated that a cover member 37 can be connected to the top of each heat absorbing tube 20. The cover member 37 further aids in retaining heat between the reflecting panels 36 and the cover member 37 to aid in transferring solar heat to the leach solution while the leach solution is in the heat absorbing tubes 20. In the preferred embodiment of the invention, the cover member 37 is formed from a clear plastic material. However, the cover member 37 is not required while operating within the scope of the present invention.

As previously discussed, in the preferred embodiment of the invention, the heat absorbing tubes 20, the reflecting panels 36 between the tubes and the main conduit 26 are all formed from the same material and are joined to form the integrally constructed heat absorbing mat 21. Preferably, the material used to construct the heat absorbing mat 21 is sufficiently flexible such that during installation of the heat absorbing mat 21 on the ore heap 12, the mat supply main 26 is first extended width-wise across the ore heap 12 and joined to the supply pipe 18. Once connected, the joined heat absorbing tubes 20 are unrolled to cover a portion of the ore heap 12 as shown in FIG. 1. Since the parallel heat absorbing tubes 20 are joined by the reflecting panels 36, the reflecting panels 36 provide the required spacing between adjacent heat absorbing tubes 28.

The method of heap leach mining utilizing the distribution mats 20 discussed above will now be described in greater detail. Initially, after the heap of ore has been created, the series of emitter tubes 28 are laid out in a spaced array over the top of the ore heap, as illustrated in FIG. 4. In the preferred embodiment of the invention, the emitter tubes 28 are formed from a metal material and are conventional emitter tubes that have previously been used in leach heap mining.

Referring back to FIG. 4, once the emitter tubes 28 are laid out, each of the emitter tubes 28 is connected to either one of the individual heat absorbing tubes 20 or a common conduit (not shown) that receives the solar heated leach solution from the heat absorbing tubes 20. In the embodiment of the invention illustrated in FIG. 4, each of the emitter tubes 28 is connected directly to one of the heat absorbing tubes 20. However, it is contemplated by the inventor that each of the heat absorbing tubes 20 could empty into a common conduit (not shown) which in turn would be connected to each of the plurality of emitter tubes 28. In each case, after the supply of leach solution has passed through the heat absorbing tubes 20, the heated leach solution then enters into the separate array of emitter tubes 28 for distribution onto the ore heap 12 through the emitter openings 30. As can be understood in FIGS. 4 and 5, the heat absorbing mat 21 is formed separately from the plurality of the emitter tubes 28 and connected to the array of the emitter tubes to allow heated leach solution to be distributed onto the ore heap after it has been heated by the distribution mat.

Initially, a supply of leach solution is pumped from the reservoir 16 by the conventional pump 17, as shown in FIG. 1. The leach solution contained in the reservoir 16 is at ambient temperature, since the reservoir 16 is generally exposed to the environment. As previously discussed, the leach solution extracts a larger percentage of metal from the low grade ore in the heap 12 when the leach solution is at an elevated temperature above ambient. In some prior art systems, it was suggested to heat the leach solution within the reservoir 16 before it is pumped through the supply pipe 18 and distributed onto the ore heap 12. However, due to the relatively long travel time and the overall length of piping that the leach solution is contained within before it is actually distributed over the ore heap 12, a large amount of the heat applied to the leach solution while in the reservoir 16 is lost to the environment before the leach solution actually contacts the ore heap 12. Thus, any advantage gained in the amount of metal recovered was lost in the cost of heating the leach solution.

After flowing through the supply pipe 18, the supply of leach solution enters into one of the main conduits 26 for the plurality of heat absorbing mats 21 positioned on the top surface of the ore heap 12. The leach solution flowing in each of the mat supply main conduit 26 flows out of the mat supply main 26 and into the plurality of individual heat absorbing tubes 20 joined to the mat supply main conduit 26. The rate at which the leach solution is distributed to the heat absorbing tubes 20 depends on a number of predetermined factors, such as the type of leach solution, the size of the emitter tubes below the heat absorbing mats 21 and the spacing of the emitter tubes relative to each other. Additionally, the required time of contact of the leach solution with the ore bed 12 will largely be determined by the degree of pulverization of the ore, the strength of the, leaching solution, the degree of solubility of the metal or the form in which it occurs, and the effectiveness of the contact. However, as previously discussed, the effectiveness of the leach solution is increased by elevating the temperature of the leach solution relative to ambient.

As the leach solution flows through each of the heat absorbing tubes 20, the leach solution absorbs the solar heat. The heat absorbed is transferred to the leach solution passing through the open interior 34 of each heat absorbing tube 20. In the preferred embodiment of the invention, the temperature of the leach solution can be elevated by approximately 5–8° F. above ambient during periods of full sun prior to the leach solution being applied to the ore heap 12. An increase in temperature of 1° F. allows up to 1% more metal to be recovered from the ore heap 12.

In the preferred embodiment of the invention, each of the heat absorbing tubes 20 is formed from a material having a dark color such that the heat absorbing tubes 20 absorb as much solar energy as possible. In addition, the reflecting panels 36 aid in directing solar energy toward the heat absorbing tubes 20 to further aid in heating of the leach solution within the open interior 34. As discussed previously, a cover member 37 can be placed over the top of the heat absorbing tubes 20 to aid in the transfer of solar energy from the heat absorbing mat to the actual leach solution within the open interior 34 of each heat absorbing tube 20.

Once the leach solution has been heated within the heat absorbing tubes 20, the leach solution travels through the supply connection 27 positioned between the heat absorbing tube 20 and one of the emitter tubes 28, as illustrated in FIG. 4.

As discussed previously, the supply connection 27 between the heat absorbing tubes and the emitter tubes 28 can be formed in many different ways. In the embodiment of the invention illustrated in FIG. 4, each individual emitter tube 28 is connected to one of the heat absorbing tubes 20. However, it is contemplated by the inventor that the heat absorbing tubes 20 could empty into a common conduit to which the emitter tubes 28 are connected. In this type of configuration, the common conduit would serve as a connector between the individual heat absorbing tubes 20 and the emitter tubes 28 and reduce the set up time required to position the system of the invention over an ore heap.

Once the heated leach solution is received within the emitter tube 28, the leach solution flows through the emitter tube 28 and exits the plurality of pores 30 formed in the emitter tube 28. In accordance with the present invention, the leach solution is heated immediately prior to it entering the series of emitter tubes 28 located beneath the heat absorbing mat such that little to no heat is lost before the solution is distributed.

After the leach solution has passed through the ore heap 12 and removes the desired metal material, the pregnant leach solution is collected on the impervious pad 14 and flows downward into the collection trough 22. Once in the collection trough 22, the copper-bearing leach solution flows into the collection reservoir 24. The pregnant leach solution in the reservoir 24 is then processed to remove the suspended copper from the leach solution in a conventional manner.

By utilizing the heat absorbing mats 21 of the present invention, each of the heat absorbing mats 21 can be quickly and simply rolled out from a large spool after the array of emitter tubes 28 is positioned on the top surface of the ore heap 12. In the preferred embodiment of the invention, each of the heat absorbing mats 21 is formed from a flexible "rubber" like material that can be rolled into large spools and transported after the ore heap 12 has been completely leached.

Various alternatives and embodiments are contemplated as being within the scope of the following claims particularly pointing out and distinctly claiming the subject matter regarded as the invention.

I claim:

1. A method of heap leach mining to remove a metallic material from a heap of ore accumulated upon an impervious pad comprising the steps of:

positioning a plurality of emitter tubes in a spaced relationship to each other on the ore heap, each emitter tube having a plurality of emitter openings;

positioning at least one heat absorbing mat over the plurality of emitter tubes, the heat absorbing mat having a plurality of spaced heat absorbing tubes each coupled to a main conduit;

coupling the plurality of emitter tubes to the plurality of heat absorbing tubes such that the plurality of heat absorbing tubes are intermediate the main conduit and the emitter tubes during flow of a leach solution therethrough;

communicating a flow of the leach solution to the main conduit, wherein the flow of leach solution passes from the main conduit into the plurality of heat absorbing tubes;

transferring solar energy to the leach solution while the leach solution is in the heat absorbing tubes to heat the leach solution to an elevated temperature above an ambient temperature;

transferring the solar-heated leach solution into the plurality of emitter tubes;

emitting the solar-heated leach solution through the emitter openings such that the leach solution percolates through the heap of ore; and collecting the leach solution from the impervious pad after the leach solution has percolated through the ore heap.

2. The method of claim 1 further comprising the step of positioning a reflecting panel between adjacent heat absorbing tubes such that the reflecting panels define the spacing between the heat absorbing tubes such that the combination of the heat absorbing tubes and the reflecting panels form the heat absorbing mat.

3. The method of claim 1 wherein each of the emitter tubes is coupled to one of the heat absorbing tubes.

4. The method of claim 2 further comprising the step of positioning a cover member over the plurality of spaced heat absorbing tubes, the cover member being spaced from the reflecting panels such that the cover member retains heat between the cover member and the reflecting panels.

5. The method of claim 1 wherein the heat absorbing mat is formed from a flexible polyethylene.

6. The method of claim 2 wherein each reflecting panel is tangentially joined to each of the adjacent heat absorbing tubes.

7. The method of claim 1 wherein each of the heat absorbing tubes is connected to a collection conduit and each of the emitter tubes are also connected to the collection conduit.

8. A method for extracting metallic material from ore, the method comprising the steps of:

accumulating a heap of ore on an impervious pad;

positioning a plurality of emitter tubes in a spaced relationship to each other on the ore heap, each emitter tube having a plurality of emitter openings;

positioning at least one main conduit on the ore heap, the main conduit being in fluid communication with a supply of leach solution;

distributing the leach solution from the main conduit to a plurality of heat absorbing tubes in fluid communication with the main conduit, the plurality of heat absorbing tubes being positioned in a laterally spaced parallel relationship relative to each other;

positioning a reflecting panel between each adjacent heat absorbing tube to reflect solar energy toward the heat absorbing tubes;

transferring the solar energy from the heat absorbing tubes to the leach solution to heat the leach solution to an elevated temperature above an ambient temperature while the leach solution is within the heat absorbing tubes;

transferring the solar-heated leach solution from the heat absorbing tubes to the emitter tubes;

emitting the solar-heated leach solution from the emitter openings of each emitter tube such that the leach solution percolates through the heap of ore;

collecting the leach solution from the impervious pad after the leach solution has percolated through the ore heap; and recovering the metal contained in the leach solution after the leach solution has percolated through the ore heap.

9. The method of claim 8 wherein the solar-heated leach solution travels directly from the heat absorbing tubes to the emitter tubes.

10. The method of claim 8 wherein the distribution mat is formed from a flexible polyethylene.

* * * * *